(12) United States Patent
Oda et al.

(10) Patent No.: US 11,075,592 B2
(45) Date of Patent: Jul. 27, 2021

(54) VIBRATING TYPE ACTUATOR PERFORMING LINEAR DRIVING, AND ELECTRONIC DEVICE

(71) Applicant: CANON KABUSHIKI KAISHA, Tokyo (JP)

(72) Inventors: Yuki Oda, Yokohama (JP); Makoto Shihoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 390 days.

(21) Appl. No.: 16/245,449

(22) Filed: Jan. 11, 2019

(65) Prior Publication Data
US 2019/0222145 A1    Jul. 18, 2019

(30) Foreign Application Priority Data
Jan. 18, 2018    (JP) .............................. JP2018-006682

(51) Int. Cl.
| H02N 2/02 | (2006.01) |
| H02N 2/00 | (2006.01) |
| H02N 2/04 | (2006.01) |
| G02B 7/08 | (2021.01) |

(52) U.S. Cl.
CPC .............. *H02N 2/026* (2013.01); *G02B 7/08* (2013.01); *H02N 2/001* (2013.01); *H02N 2/006* (2013.01); *H02N 2/0015* (2013.01); *H02N 2/04* (2013.01)

(58) Field of Classification Search
CPC ...... H02N 2/026; H02N 2/0015; H02N 2/006; H02N 2/04; H02N 2/001; G02B 7/08
See application file for complete search history.

(56) References Cited

U.S. PATENT DOCUMENTS

| 7,109,639 | B2 * | 9/2006 | Yamamoto | H02N 2/0015 310/323.01 |
| 8,288,919 | B2 | 10/2012 | Mukae | |
| 8,749,117 | B2 * | 6/2014 | Maruyama | H02N 2/163 310/323.02 |
| 8,760,036 | B2 * | 6/2014 | Kojima | H02N 2/026 310/323.02 |

(Continued)

FOREIGN PATENT DOCUMENTS

| JP | 5244727 B2 | 7/2013 |
| JP | 2017200260 A | 11/2017 |

*Primary Examiner* — Emily P Pham
(74) *Attorney, Agent, or Firm* — Rossi, Kimms & McDowell LLP

(57) ABSTRACT

A vibrating type actuator which hardly causes a failure and can suppress occurrence of abnormal noise while not preventing vibration from being excited in a vibrator. The vibrating type actuator comprises a vibrator in which vibration is excited, and a contact body which is in contact with the vibrator, wherein the vibrator and the contact body move relatively to each other. The vibrating type actuator comprises a holding member which holds the vibrator, a pressurizing member which pressurizes the vibrator against the contact body, a support member which movably supports the holding member in a pressurizing direction, in which the pressurizing member performs pressurization, and an vibration damping member which is in contact with the holding member at a plurality of portions while sandwiching the holding member in a direction orthogonal to the pressurizing direction.

12 Claims, 13 Drawing Sheets

(56) References Cited

U.S. PATENT DOCUMENTS

| | | | |
|---|---|---|---|
| 2015/0103424 A1* | 4/2015 | Araki | H02N 2/026 359/824 |
| 2016/0127623 A1* | 5/2016 | Shimada | G02B 21/26 348/360 |
| 2017/0310245 A1 | 10/2017 | Kojima | |

* cited by examiner

A MODE

B MODE

PRIOR ART

VIBRATING TYPE ACTUATOR PERFORMING LINEAR DRIVING, AND ELECTRONIC DEVICE

BACKGROUND OF THE INVENTION

Field of the Invention

The present invention relates to a vibrating type actuator and an electronic device, and more particularly relates to a vibrating type actuator which performs linear driving, and an electronic device.

Description of the Related Art

One of features of a vibrating type actuator is good quietness. However, actually, when a vibrator (driving body) which constitutes the vibrating type actuator is driven, abnormal noise sometimes occurs due to a reason that the vibrator collides against a holding member which holds the vibrator or unnecessary vibration caused in the vibrator transmits to another part and causes resonance. In a case where such abnormal noise occurs, quietness is not kept. For example, Japanese Patent No. 5244727 discloses a technique of preventing abnormal noise from occurring when a vibrator collides against another part. More specifically, a vibrating type actuator disclosed in Japanese Patent No. 5244727 has a slight gap between an actuator main body and an actuator support part. Hence, it is concerned that, when the actuator main body vibrates, a part of the actuator main body contacts to a wall surface of the actuator support part, and abnormal noise occurs. Therefore, a rubber is provided on the wall surface of the actuator main body to suppress vibration occurred not by the actuator main body driving, to thereby avoid collision of the actuator main body against the actuator support part.

On the other hand, to stabilize driving characteristics of the vibrating type actuator, it is important to stably hold the vibrator such that a predetermined amplitude is generated without suppressing vibration excited in the vibrator. For this purpose, it is necessary to precisely determine a relative positional relationship between the vibrator and the contact body, and it is important to stably maintain a contact state between the vibrator and the contact body. A technique which solves this problem is disclosed in, for example, Japanese Laid-Open Patent Publication (kokai) No. 2017-200260. Japanese Laid-Open Patent Publication (kokai) No. 2017-200260 discloses a vibrating type actuator which includes a vibrator, a contact body, a pressurizing unit, a holding member which holds the vibrator, and a support member which supports the holding member. In this vibrating type actuator, fitting holes formed on the holding member and protrusion parts formed on the support member fit with each other, and the holding member is slidable in a direction in which the pressurizing unit pressurizes the vibrator against the contact body. In this way, a pressurizing force applied to the vibrator by the pressurizing unit directly transmits to the vibrator. Furthermore, Japanese Laid-Open Patent Publication (kokai) No. 2017-200260 discloses a configuration to apply a pressurizing force to a side surface of the holding member from one direction, and discloses that this pressurizing force can precisely position the holding member with respect to the support member.

However, in the vibrating type actuator disclosed in Japanese Patent No. 5244727, the rubber is provided on the vibrator of the actuator main body, and therefore it is concerned that vibration to be excited in the vibrator is suppressed. As a result, it is concerned that desired driving performance cannot be obtained, or energy (electric power), which is necessary to obtain a desired vibration amplitude, increases.

Hereinafter, a method for preventing abnormal noise in the vibrating type actuator disclosed in above-mentioned Japanese Laid-Open Patent Publication (kokai) No. 2017-200260 will be studied. FIG. 13 is a side view schematically showing one example of a configuration to prevent occurrence of abnormal noise in the vibrating type actuator disclosed in Japanese Laid-Open Patent Publication (kokai) No. 2017-200260. An elastic body 91 on which projection parts 91a are formed is attached to a holding part 95 as the holding member at left and right ends. The vibrator formed by adhering a piezoelectric element 92 to the elastic body 91 is applied a pressurizing force F1 from a biasing member 94 via a pressurizing block 93. Hereinafter, a configuration where a vibration prevention member 97 is disposed between the holding part 95 of the holding member and a support part 96 to prevent occurrence of abnormal noise, will be studied. In this case, when a difference is generated between the pressurizing force F1 to be applied to the vibrator and a reaction force F2 to be applied to the holding part 95 due to elasticity of the vibration prevention member 97, the vibrator warps. As a result, it is concerned that a failure occurs by the elastic body 91 being detached from the holding part 95 or the piezoelectric element 92 being released from the elastic body 91.

Furthermore, as disclosed in Japanese Laid-Open Patent Publication (kokai) No. 2017-200260, according to the configuration where the side surface of the holding member is pressurized from one direction to position the holding member with respect to the support member, the pressurizing force is concerned to become a load for the holding member to move in a direction in which the vibrator is pressurized against the contact body. When movement of the holding member is prevented in the direction in which the vibrator is pressurized against the contact body, a vibration state of the vibrator is concerned to become unstable or abnormal noise is concerned to occur.

SUMMARY OF THE INVENTION

The present invention provides a vibrating type actuator which hardly causes a failure and can suppress occurrence of abnormal noise while not preventing vibration from being excited in a vibrator, and an electronic device.

Accordingly, the present invention provides a vibrating type actuator that comprises a vibrator in which vibration is excited, and a contact body which is in contact with the vibrator, wherein the vibrator and the contact body move relatively to each other, the vibrating type actuator comprising a holding member configured to hold the vibrator, a pressurizing unit configured to pressurize the vibrator against the contact body, a support member configured to movably support the holding member in a pressurizing direction, in which the pressurizing unit performs pressurization, and an vibration damping member which is in contact with the holding member at a plurality of portions while sandwiching the holding member in a direction orthogonal to the pressurizing direction.

The present invention can realize a vibrating type actuator which hardly causes a failure and can suppress occurrence of abnormal noise while not preventing vibration from being excited in a vibrator, and an electronic device.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

First Embodiment

Figure 1:
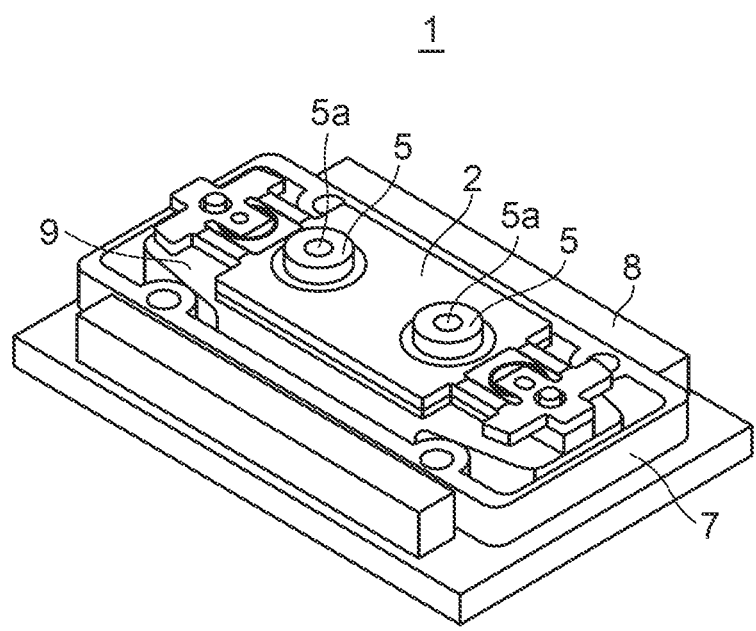
FIG. 1 is a perspective view showing a schematic configuration of a vibrator unit which constitutes a vibrating type actuator according to the first embodiment.
Figure 2:
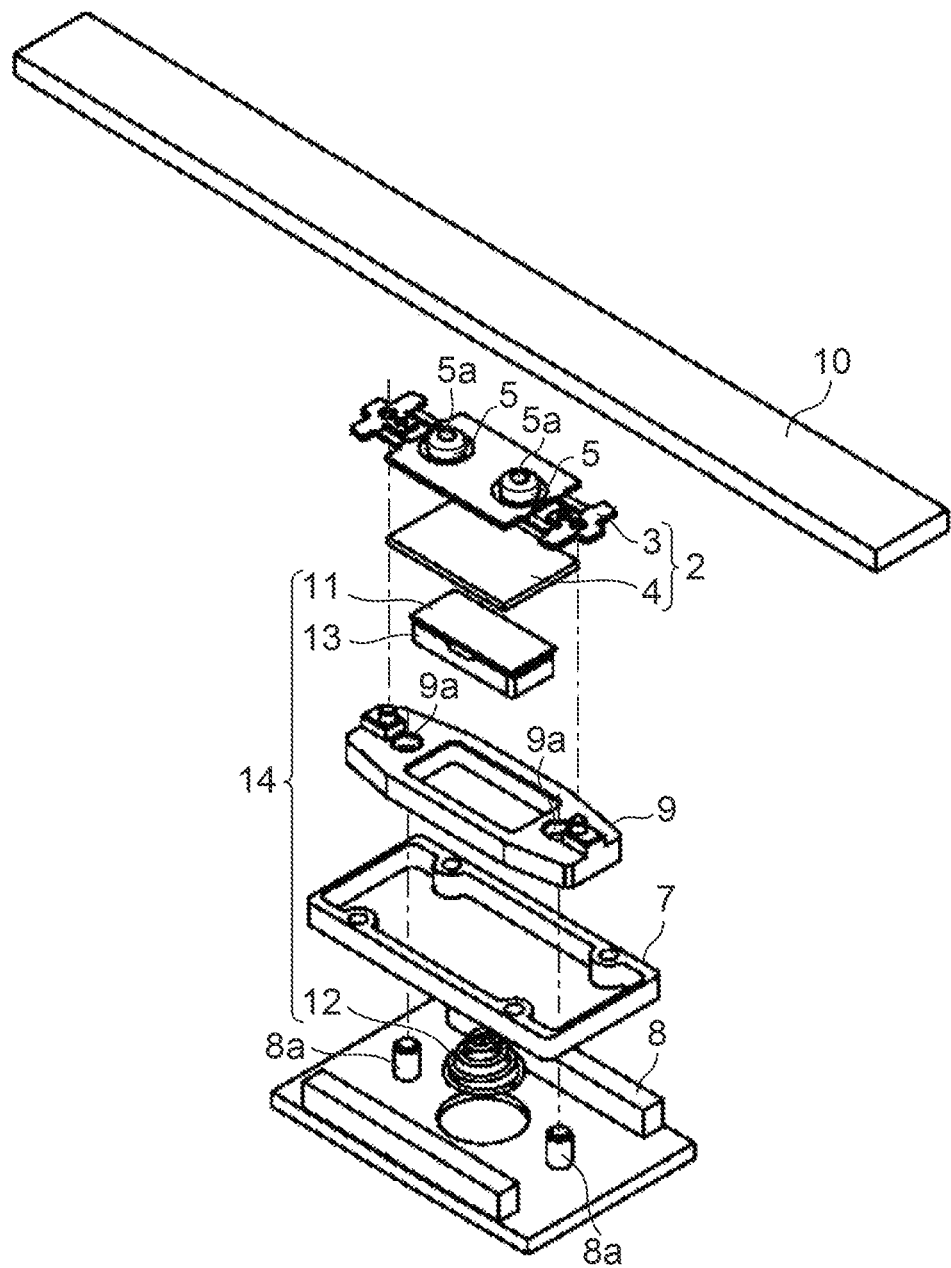
FIG. 2 is an exploded perspective view of the vibrating type actuator according to the first embodiment.

FIG. 1 is a perspective view showing a schematic configuration of a vibrator unit 1 which constitutes a vibrating type actuator according to the first embodiment. FIG. 2 is an exploded perspective view of the vibrating type actuator according to the first embodiment. The vibrating type actuator includes the vibrator unit 1 and a contact body 10. The vibrator unit 1 includes a vibrator 2, a vibration damping member 7, a support member 8, a holding member 9 and a pressurizing unit 14.

The vibrator 2 includes an elastic body 3 having a thin plate shape and a piezoelectric element 4 having a plate shape. The elastic body 3 is made of an iron-based metal material (e.g., SUS420J2). The piezoelectric element 4 is an electrical-mechanical energy conversion element, and is adhered (bonded) to one surface in a thickness direction of the elastic body 3. Projection parts 5 are provided at two portions on the other surface in the thickness direction of the elastic body 3. In this regard, the projection parts 5 are molded integrally with the elastic body 3, and are molded when a metal thin plate member used for the elastic body 3 is pressed. In this regard, the projection parts 5 are not limited to this configuration, and may be a member separate from the elastic body 3 and attached to the elastic body 3 by welding or adhesion.

The vibrator 2 is fixed to the holding member 9 by means of, for example, welding or adhesion near an end part in a longitudinal direction (a direction in which the two projection parts 5 align). Hole parts 9a are formed at two portions in the holding member 9, and protrusion parts 8a formed at two portions on the support member 8 are slidably inserted in the hole parts 9a at the two portions, respectively. The protrusion parts 8a formed at the two portions on the support member 8 may be integrally formed with the support member 8 or may be formed by a pin prepared as a different member being press-fitted and fixed to the support member 8. The vibration damping member 7 is disposed to surround the holding member 9. A structure and a function of the vibration damping member 7 will be described below.

The pressurizing unit 14 is a unit which places the vibrator 2 into contact with the contact body 10 which is to be in contact with the vibrator 2, and includes a buffer member 11, a pressurizing block 13 and a pressurizing member 12. The buffer member 11 is a member which disperses a pressurizing force applied from the pressurizing member 12, and is attached to the pressurizing block 13 by means of adhesion, for example. For example, a felt can be used for the buffer member 11. The buffer member 11 is in contact with a surface which is one of two surfaces in the thickness direction of the piezoelectric element 4 and is not adhered to the elastic body 3. The pressurizing member 12 pressurizes the vibrator 2 against the contact body 10 via the pressurizing block 13 and the buffer member 11, so that distal ends 5a of the projection parts 5 pressurize and contact with the contact body 10. A direction in which the pressurizing member 12 pressurizes the distal ends 5a of the projection parts 5 of the vibrator 2 against the contact body 10 will be referred to as a "pressurizing direction" below. The pressurizing direction is parallel to an axial direction of the projection parts 5 (i.e., parallel to the thickness direction of the elastic body 3). The pressurizing member 12 is shown as a conical coil spring in FIG. 2, but is not limited to this. Coil springs having other shapes such as cylindrical coil springs, barrel-shaped coil springs or hourglass-shaped coil springs may be used as the pressurizing member 12, or a leaf spring may be used instead of the coil springs.

Figure 3A:
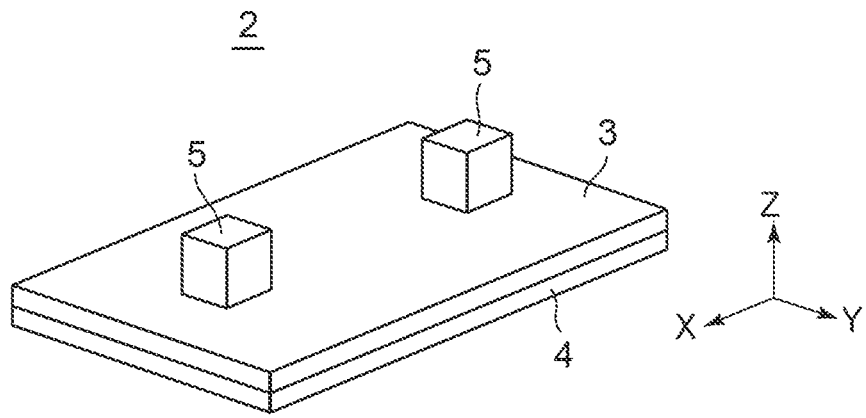
FIGS. 3A to 3C are schematic views for explaining vibration excited in a vibrator.
Figure 3B:
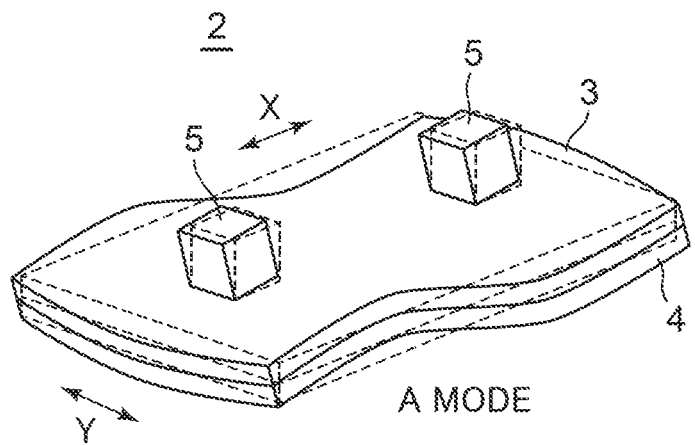
Figure 3C:
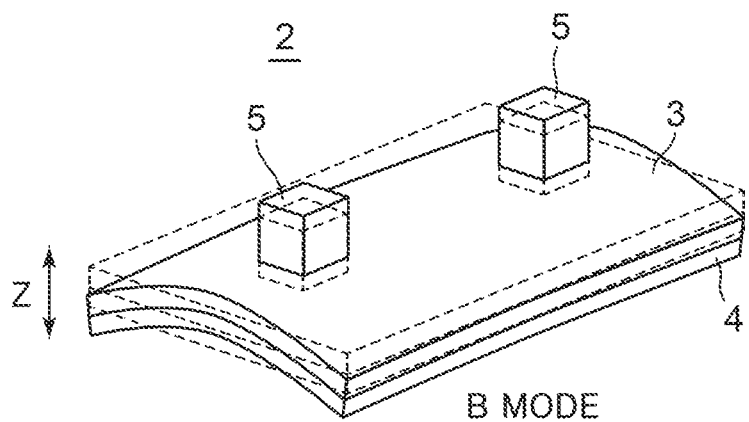

Hereinafter, vibration excited in the vibrator 2 will be described. FIG. 3A is a perspective view showing the simplified vibrator 2. FIG. 3B is a view for explaining a first vibration mode (herein after referred to as an "A mode") out of two bending vibration modes excited in the vibrator 2. The A mode is a second-order bending vibration in a direction parallel to a relative moment direction in which the vibrator 2 and the contact body 10 move relatively to each other and orthogonal to the pressurizing direction (in a longitudinal direction of the vibrator 2, hereinafter also referred to as "X direction"). In the A mode, there are three nodal lines substantially parallel to a direction orthogonal to the relative moment direction in which the vibrator 2 and the contact body 10 move relatively to each other and orthogonal to the pressurizing direction (a shorter direction of the vibrator 2, hereinafter also referred to as "Y direction" (width direction)). The projection parts 5 are disposed near positions which become nodes of vibration in the A mode, and make a reciprocating motion in the X direction when the vibration in the A mode is excited in the vibrator 2. FIG. 3C is a view for explaining a second vibration mode (referred to as a "B mode" below) out of two bending vibration modes excited in the vibrator 2. The B mode is first-order bending vibration in the shorter direction (Y direction) of the vibrator 2, and includes two nodal lines substantially parallel to the longitudinal direction (X direction). The projection parts 5 are disposed near positions which become antinodes of vibration in the B mode, and make a reciprocating motion in the axial direction (Z direction) of the projection parts 5 when the vibration in the B mode is excited in the vibrator 2.

In this regard, the vibrator 2 is formed such that the nodal lines in the A mode and the nodal lines in B modes are substantially orthogonal to each other on an XY plane. Hence, by exciting the vibration in the A mode and the vibration in the B mode at a predetermined phase difference, it is possible to cause the distal ends of the projection parts 5 to make an elliptical motion on a ZX plane, and apply a driving force in the X direction to the contact body 10 (not shown in FIGS. 3A to 3C. See FIG. 2). It should be noted that a flexible board (not shown) is adhered to the piezoelectric element 4, and, by supplying an alternating current to the piezoelectric element 4 via the flexible board, it is possible to simultaneously excite the vibration of the A mode and the vibration of the B mode in the vibrator 2.

Next, a mechanism which prevents occurrence of abnormal noise in the vibrator unit 1 will be described. By disposing the vibration damping member around the holding member 9 or around the contact body 10 while pressurizing and contacting with the holding member 9 or the contact body 10, it is possible to effectively prevent occurrence of abnormal noise. The present embodiment assumes a case where the vibration damping member cannot be disposed around the contact body 10. In one example, since the entire contact body 10 is long in relative movement directions of the contact body 10 and the vibrator unit 1 to each other, in a case where the vibration damping member is disposed on a surface of the contact body 10 on a side opposite to the surface which is in contact with the vibrator 2, the contact body 10 deforms in some cases. Hence, in the present embodiment, the vibration damping member 7 is disposed between the holding member 9 and the support member 8 to suppress unnecessary vibration and suppress occurrence of abnormal noise.

In the vibrator unit 1, the pressurizing member 12 pressurizes the vibrator 2 in the pressurizing direction via the pressurizing block 13 and the buffer member 11, and therefore the pressurizing force of the pressurizing member 12 does not act on the holding member 9. In a case where the vibration damping member is sandwiched between the holding member 9 and the support member 8 in the pressurizing direction, if a difference is generated between the pressurizing force of the pressurizing member 12 and a reaction force to be applied to the holding member 9 when the vibration damping member is crushed, the elastic body 3 is concerned to be warped. When the elastic body 3 is warped in this way, the piezoelectric element 4 is readily released from the elastic body 3, and the vibrator 2 is readily detached from the holding member 9.

Hence, in the present embodiment, the vibration damping member 7 which surrounds the holding member 9 on a plane orthogonal to the pressurizing direction is disposed. As a result, in the vibrator unit 1, a given pressure applied to the vibration damping member 7 by the holding member 9 and a reaction force applied to the holding member 9 from the vibration damping member 7 in response to this given pressure (a pressing force of the vibration damping member 7 which presses the holding member 9) act in a direction orthogonal to the pressurizing direction. The direction in which these given pressure and reaction force (pressing force) act will be referred to as a "damping force acting direction" below.

On the other hand, a force which acts on the holding member 9 due to a pressurizing force of the pressurizing member 12 for pressurizing the vibrator 2 against the contact body 10 acts in a direction (pressurizing direction) orthogonal to the damping force acting direction. Thus, by making a direction of the force which acts on the holding member 9 from the pressurizing member 12 and a direction of the force which acts on the holding member 9 from the vibration damping member 7 different from each other, it is possible to prevent the vibrator 2 from warping. As a result, it is possible to prevent the vibrator 2 from being detached from the holding member 9 and the piezoelectric element 4 from being released from the elastic body 3, and realize a configuration where a failure hardly occurs. It should be noted that, in the present embodiment, a component in a pressurizing direction of a force applied to the holding member 9 from the vibration damping member 7 is made substantially zero. Consequently, it is possible to maximize the effect of preventing the vibrator 2 from warping.

A soft resin material is suitably used for the vibration damping member 7, and, for example, a member obtained by molding a rubber material such as a butyl rubber or a silicone rubber in a shape shown in FIG. 2 is suitably used. In this regard, the material of the vibration damping member 7 is not limited to this, and, for example, thermoplastic polyurethane (TPU), an ultraviolet curing gel or a polymer gel can be also used.

Figure 4A:
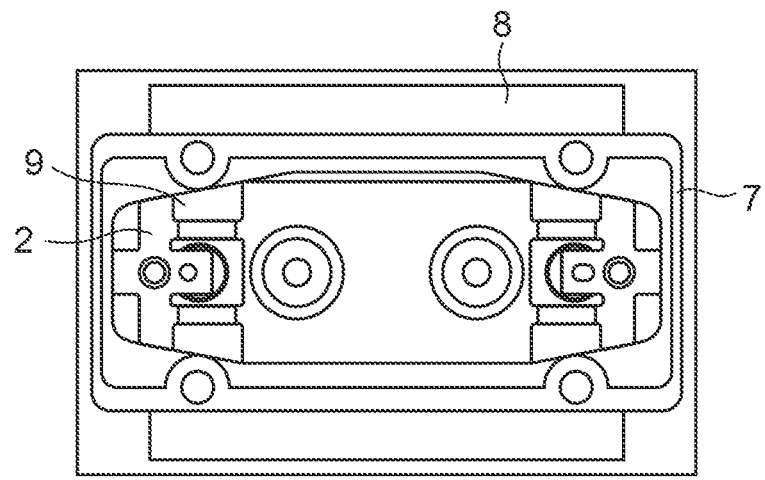
FIGS. 4A to 4C are views for explaining a vibrator unit and a vibration damping member.

The effect obtained by disposing the vibration damping member 7 which surrounds the holding member 9 on a plane will be described below. FIG. 4A is a plan view of the vibrator unit 1. The vibration damping member 7 is in contact with the holding member 9 while sandwiching the holding member 9 in the shorter direction of the holding member 9. A resultant force of the pressing force applied to the holding member 9 by the vibration damping member 7 is substantially zero, so that the resultant force of the pressing force does not become a load when the holding member 9 slides with respect to the protrusion part 8a of the support member 8.

Figure 4B:
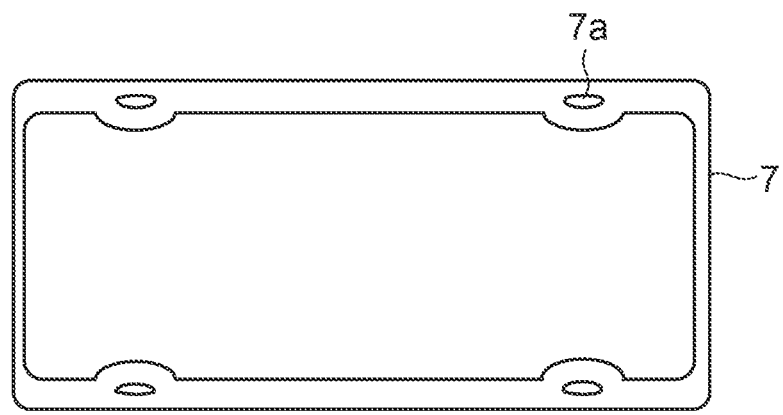

FIG. 4B is a plan view showing a schematic shape of the vibration damping member 7 in the vibrator unit 1. The vibration damping member 7 includes hole parts 7a formed near a contact position which is in contact with the holding member 9, the hole parts 7a penetrating the vibration damping member 7 in a direction orthogonal to a contact surface between the vibration damping member 7 and the holding member 9. The vibration damping member 7 and the holding member 9 are in contact with each other in a state where the hole parts 7a are crushed as shown in FIG. 4B. In a state where the hole parts 7a of the vibration damping member 7 are crushed, the vibration damping member 7 can reliably apply the pressing force in the damping force acting direction to the holding member 9. Furthermore, by forming and deforming the hole parts 7a, it is possible to reduce the reaction force due to the deformation compared to a case where compression and deformation are performed without forming the hole parts 7a. Consequently, it is possible to reduce the load in a case where the holding member 9 moves in the vibrator pressurizing direction.

Figure 4C:
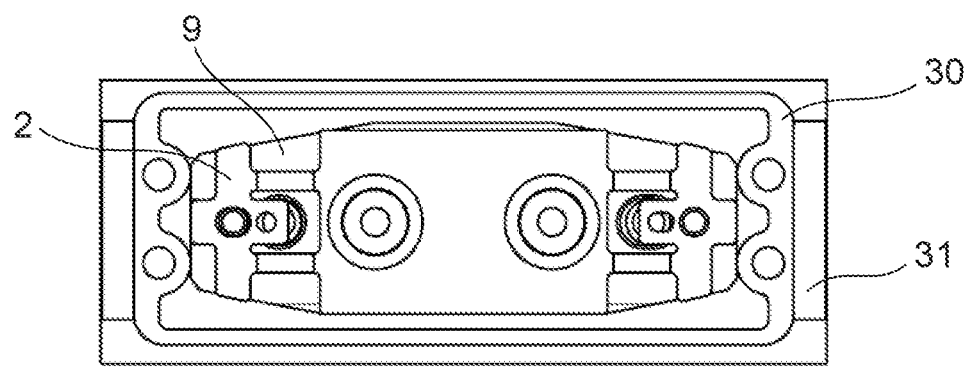

It should be noted that, it is desirable that friction coefficients of the contact parts of the vibration damping member 7 and the holding member 9 are desirably small in order to reduce the load when the holding member 9 moves in the vibrator pressurizing direction. Hence, processing for decreasing the friction coefficient such as processing for applying a fluorine coating may be performed on a surface of the vibration damping member 7. In the present embodiment, the vibration damping member 7 having the hole parts 7a formed on the vibration damping member 7 is taken up, but the vibration dumping member 7 may have non-through holes formed thereon in a case where the deformation amount of parts near the contact parts of the vibration damping member 7 which is in contact with the holding member 9 is large (in a case where the vibration damping member 7 is made of a soft material). Further, the vibrator unit 1 shown in FIG. 4A has a configuration in which the vibration damping member 7 sandwiches holding member 9 in the shorter direction of the holding member 9, but may have a configuration, as shown in FIG. 4C, in which an vibration damping member 30 disposed between the holding member 9 and a support member 31 sandwiches the holding member 9 in the longitudinal direction of the holding member 9.

In the above-mentioned vibrator unit 1, the contact parts of the vibration damping member 7 which are in contact with the holding member 9 are provided at two portions on each of the side surfaces facing each other in the shorter direction (width direction) of the holding member 9 while two positions on side surfaces respectively facing each other in the shorter direction of the holding member 9. However, the positions and the number of the contact parts between the vibration damping member and the holding member are not limited to these. The vibration damping member only has to be disposed such that the vibration damping member is in contact with the holding member at a plurality of portions and the pressing force which acts on the holding member at each contact part in the damping force acting direction is cancelled. For example, the vibration damping member may be in contact with the holding member 9 at two portions at which the holding member 9 is sandwiched in the longitudinal direction of the holding member 9. Furthermore, the vibration damping member may be in contact with the holding member 9 at two portions at which the holding member 9 is sandwiched in the shorter direction of the holding member 9 at a center part in the longitudinal direction of the holding member 9. Furthermore, the vibration damping member may be in contact with the holding member 9 at one portion on one side surface out of the two side surfaces facing each other in the shorter direction of the holding member 9, and be in contact with the holding member 9 at two portions on the other side surface.

Figure 5A:
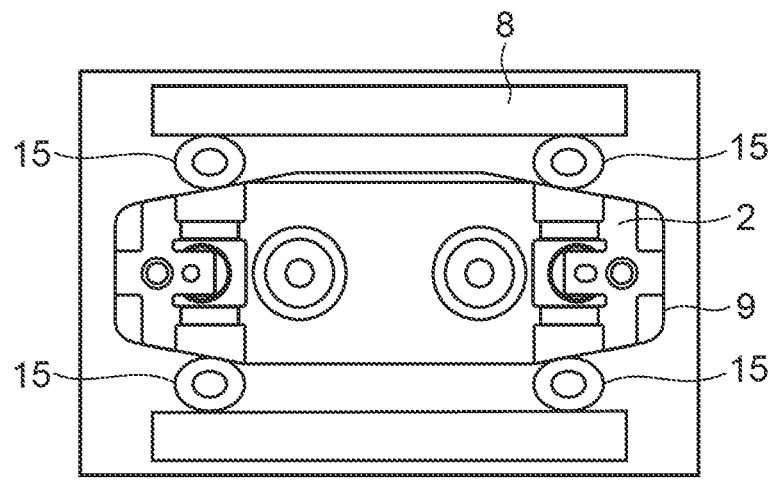
FIGS. 5A and 5B are plan views for explaining first and second variations of a vibration damping member.

FIG. 5A is a plan view for explaining vibration damping members 15 as a first variation of the vibration damping member 7. The above-mentioned vibration damping member 7 has a shape which surrounds the holding member 9. On the other hand, the vibration damping members 15 have a tube shape instead. As shown in FIG. 5A, the vibration damping members 15 desirably deform significantly to be crushed in the damping force acting direction in a state where the vibration damping members 15 are disposed. In this regard, the vibration damping members 15 are disposed at positions meeting portions at which the hole parts 7a are formed in the vibration damping member 7. That is, the vibration damping members 15 are disposed such that the contact positions with respect to the holding member 9 are the same both in a case of the vibration damping member 7 and in a case of the vibration damping members 15. In this regard, arrangement positions of the vibration damping members 15 are not limited to four portions shown in FIG. 5A, and the vibration damping members 15 may be disposed at positions at which the holding member 9 is sandwiched in the longitudinal direction of the holding member 9. A material of the vibration damping members 15 can be the same as the material of the vibration damping member 7.

Figure 5B:
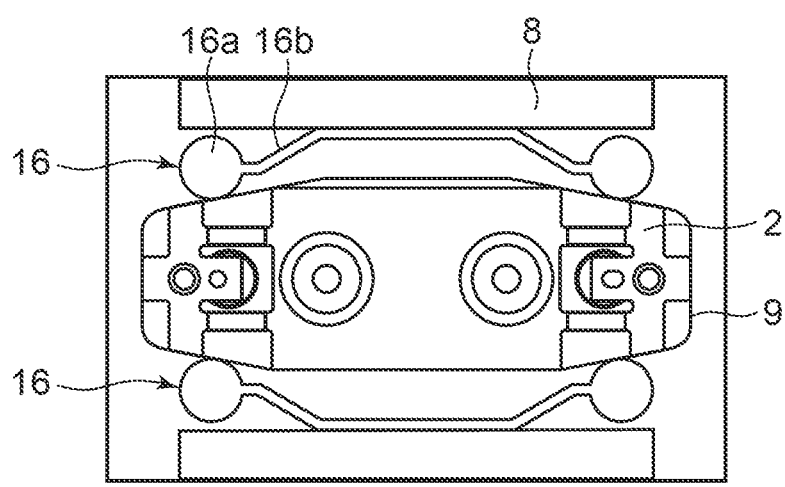

FIG. 5B is a plan view for explaining vibration damping members 16 as a second variation of the vibration damping member 7. The vibration damping member 16 adopts a structure that two columnar parts 16a are coupled by a coupling part 16b. The coupling part 16b is in contact with the support member 8, and functions as a leaf spring to press the columnar parts 16a against the holding member 9. The columnar parts 16a are disposed at positions meeting portions at which the hole parts 7a are formed in the vibration damping member 7, so that the columnar parts 16a show a function equal to that of the vibration damping member 7. In this structure, the surfaces of the two columnar parts 16a on a side opposite to the contact surfaces which are in contact with the holding member 9 do not need to be in contact with the support member 8, and a gap is formed between the columnar parts 16a and the support member 8 in the damping force acting direction. Although a material of the vibration damping member 16 can be the same as the material of the vibration damping member 7, while the coupling parts 16b need to have a spring property, the columnar parts 16a do not need to deform in a radial direction.

Second Embodiment

The present embodiment will describe a vibrating type actuator constituted by using two vibrators 2 described in the first embodiment. Similarly to the first embodiment, the present embodiment also assumes a case where a vibration damping member cannot be disposed around a contact body 10. The vibrating type actuator in which two vibrator units 1 are disposed to sandwich the contact body 10 will be described as one example.

Figure 6:
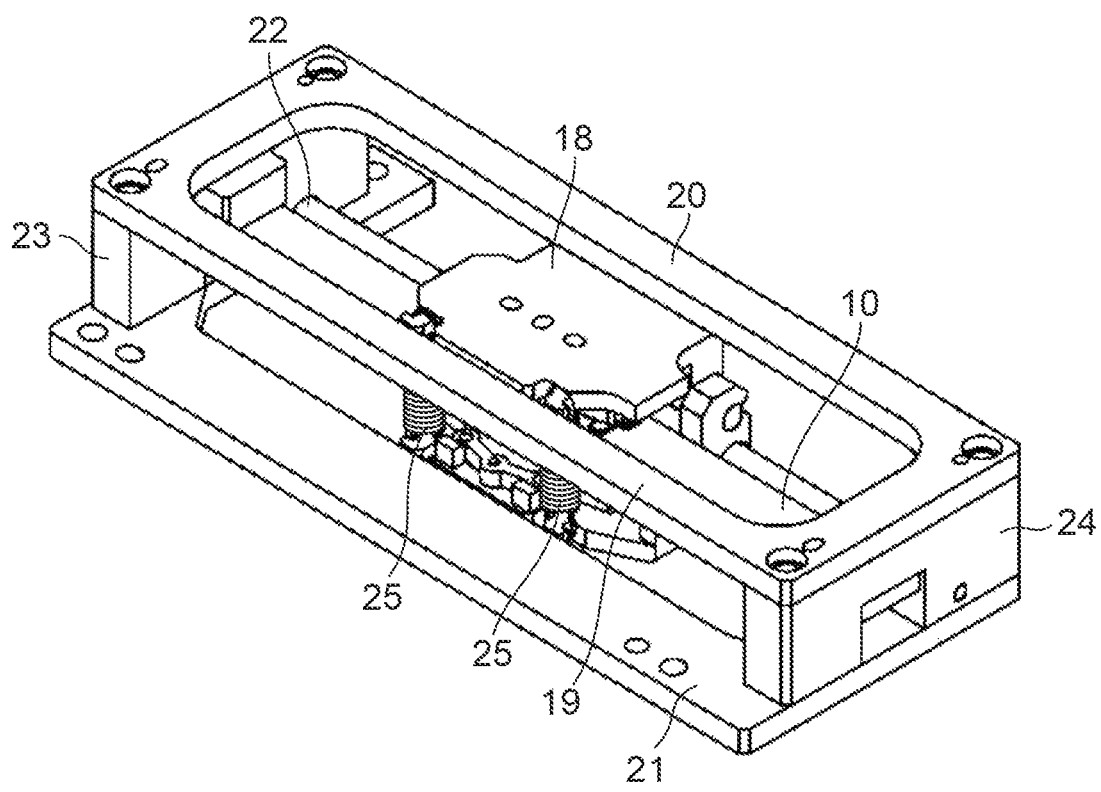
FIG. 6 is a perspective view showing a schematic configuration of a vibrating type actuator according to a second embodiment.
Figure 7:
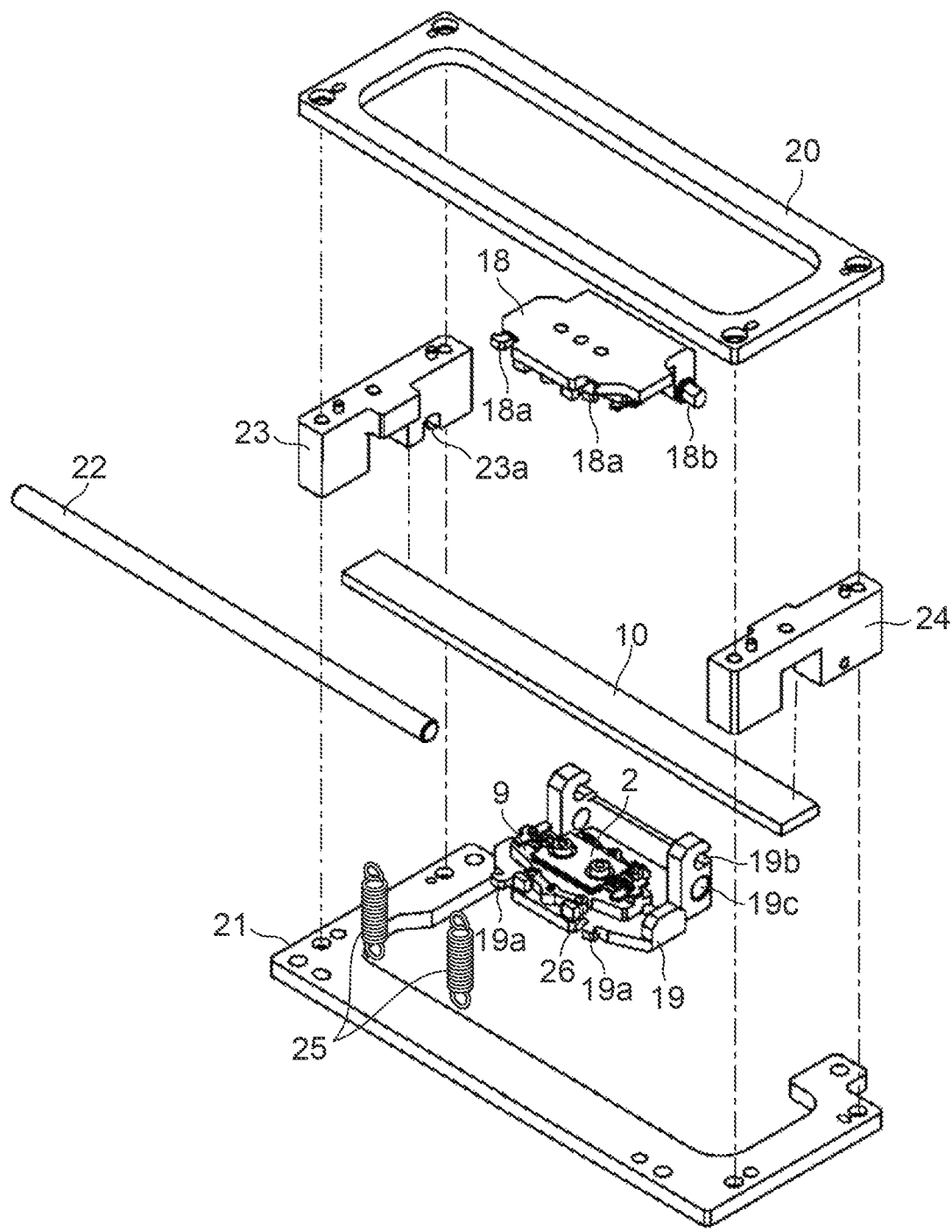
FIG. 7 is an exploded perspective view of a vibrating type actuator according to the second embodiment.

FIG. 6 is a perspective view showing a schematic configuration of a vibrating type actuator 17 according to the second embodiment. FIG. 7 is an exploded perspective view of the vibrating type actuator 17. The vibrating type actuator 17 includes the vibrators 2, a holding member 9, the contact body 10, an upper support member 18, a lower support member 19, a top plate 20, a bottom plate 21, a guide bar 22, contact body holding parts 23 and 24 and tension coil springs 25. The vibrator 2, the holding member 9 and the contact body 10 are the same as those described in the first embodiment, and therefore descriptions thereof are omitted hereinafter.

In the vibrating type actuator 17, the vibrator 2 held by the upper support member 18 and the vibrator 2 held by the lower support member 19 sandwich the contact body 10. End parts in a longitudinal direction of the contact body 10 are fixed to the contact body holding parts 23 and 24, respectively. End parts in an axial direction of the guide bar 22 are fixed to the contact body holding part 23 and 24, respectively. Each of the contact body holding parts 23 and 24, and the top plate 20 and the bottom plate 21 are respectively coupled by screws (not shown) to form an exterior part of the vibrating type actuator 17.

Hole parts 19c formed on the lower support member 19 slidably fit to the guide bar 22, so that the lower support member 19 is movable in the axial direction of the guide bar 22. The upper support member 18 is positioned with respect to the lower support member 19 by connection pins 18b provided on the upper support member 18 engaging with connection reception parts 19b formed on the lower support member 19. Consequently, the upper support member 18 and the lower support member 19 are integrally movable along the guide bar 22. The tension coil springs 25 are installed between the upper support member 18 and the lower support member 19, while the tension coil springs 25 being hooked on spring reception parts 18a formed on the upper support member 18 and spring reception parts 19a formed on the lower support member 19, to pull the upper support member 18 and the lower support member 19 toward each other. Thus, a state where distal ends 5a of projection parts 5 of the vibrators 2 respectively held by the upper support member 18 and the lower support member 19 are pressurized and placed in contact with the contact body 10 is maintained. Details of this state will be described below. It should be noted that a unit which couples the upper support member 18 and the lower support member 19 to pull them toward each other is not limited to the tension coil springs 25, and may be rubbers or conical coil springs.

According to the above configuration, in the vibrating type actuator 17, by driving the vibrators 2, the vibrators 2, the holding member 9, the upper support member 18, the lower support member 19 and the tension coil springs 25 move integrally with respect to the fixed contact body 10 in the axial direction of the guide bar 22. It should be noted that the contact body 10 is fixed in the vibrating type actuator 17. However, the upper support member 18 and the lower support member 19 may be respectively fixed, and the contact body 10 may be also movable.

Figure 8:
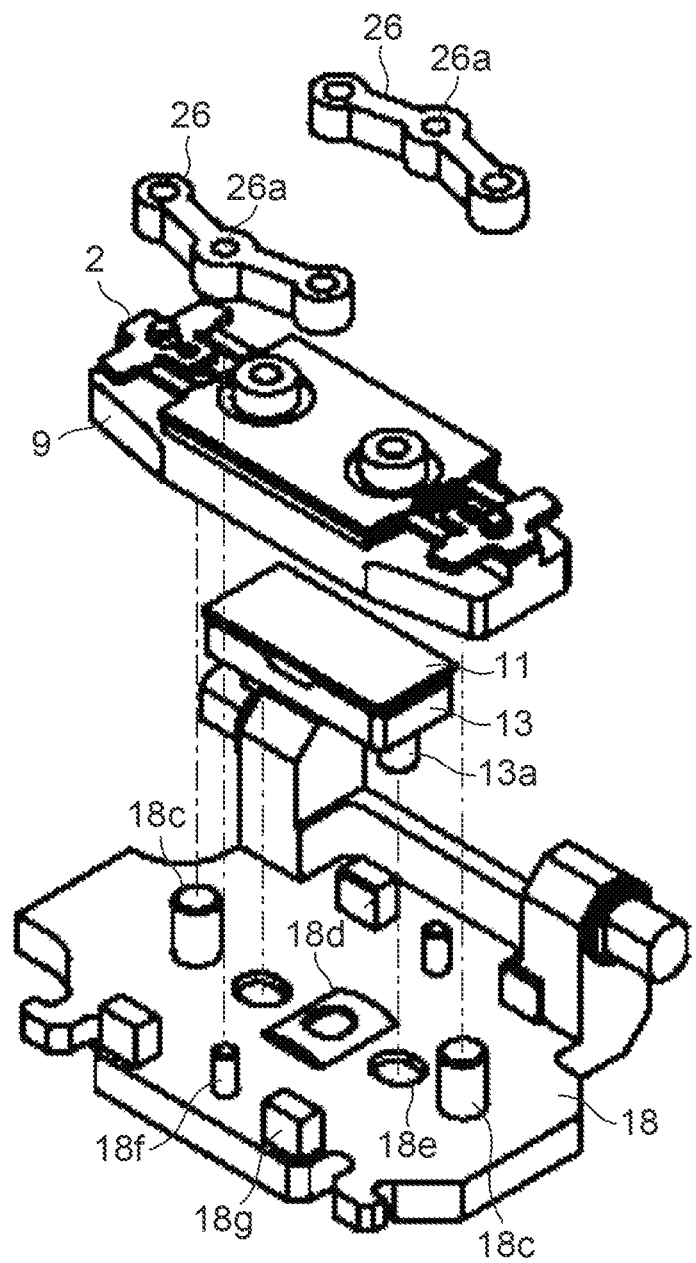
FIG. 8 is an exploded perspective view of an upper support member.

Next, a configuration of the upper support member 18 and a configuration where the distal ends 5a of the projection parts 5 of the vibrators 2 are placed in contact with the contact body 10 will be described with reference to FIG. 8. FIG. 8 is an exploded perspective view of the upper support member 18. The vibrator 2 is fixed to the holding member 9 in a similar manner of the first embodiment. Protrusion parts 18c formed on the upper support member 18 are inserted in hole parts 9a formed in the holding member 9, and the holding member 9 is slidable in the axial direction of the protrusion parts 18c. Vibration damping members 26 are attached to the upper support member 18 to sandwich the holding member 9 in a shorter direction of the holding member 9 by protrusion parts 18f formed on the upper support member 18 being inserted in hole parts 26a formed on the vibration damping members 26. The same material as the material of the vibration damping member 7 described in the first embodiment can be used for a material of the vibration damping members 26.

Similarly to the first embodiment, a buffer member 11 and a pressurizing block 13 are disposed in contact with the vibrator 2. Projection parts 13a are formed on a surface, of the pressurizing block 13, opposite to a surface to which the buffer member 11 is attached. The pressurizing block 13 is positioned with respect to the upper support member 18 by the projection parts 13a fitting in hole parts 18e formed on the upper support member 18. A pressurizing force for pressurizing the distal ends 5a of the projection parts 5 of the vibrator 2 against the contact body 10 is applied by the tension coil springs 25. More specifically, by the surface, of the pressurizing block 13, opposite to the surface to which the buffer member 11 is pasted coming into contact with a projection part 18d formed on the upper support member 18, a gap is formed between the holding member 9 and the upper support member 18, and the pressurizing block 13 is pressurized in the pressurizing direction. Thus, the pressurizing force for pressurizing the distal ends 5a of the projection parts 5 against the contact body 10 is applied only to the vibrator 2.

Similarly to the upper support member 18, the vibrator 2, the holding member 9, the buffer member 11 and the pressurizing block 13 are installed on the lower support member 19. Consequently, a force of the tension coil springs 25 pulling the upper support member 18 and the lower support member 19 toward each other is converted into a force for pressurizing the vibrators 2 against the contact body 10 in the pressurizing direction via the pressurizing block 13, and the vibrators 2 and the contact body 10 come into contact with each other at a predetermined pressurizing force.

Next, an effect of the vibration damping members 26 of the vibrating type actuator 17 will be described. The vibrating type actuator 17 adopts a structure that the contact body 10 is sandwiched between the two vibrators 2 in a thickness direction of the contact body 10, and the vibrators 2 move in the longitudinal direction of the contact body 10. Furthermore, on both sides in the shorter direction of the contact body 10, there are portions at which the upper support member 18 and the lower support member 19 are coupled and the tension coil springs 25 are disposed. Hence, it is difficult to dispose a vibration prevention member on a surface in the thickness direction of the contact body 10 while pressing the vibration prevention member. It is also difficult to dispose the vibration prevention member on the surface in the shorter direction of the contact body 10 while pressing the vibration prevention member. That is, the vibration prevention member cannot be disposed on the contact body 10 for a purpose of prevention of abnormal noise. Hence, in the vibrating type actuator 17, the vibration damping members 26 are disposed around the holding member 9.

Figure 9A:
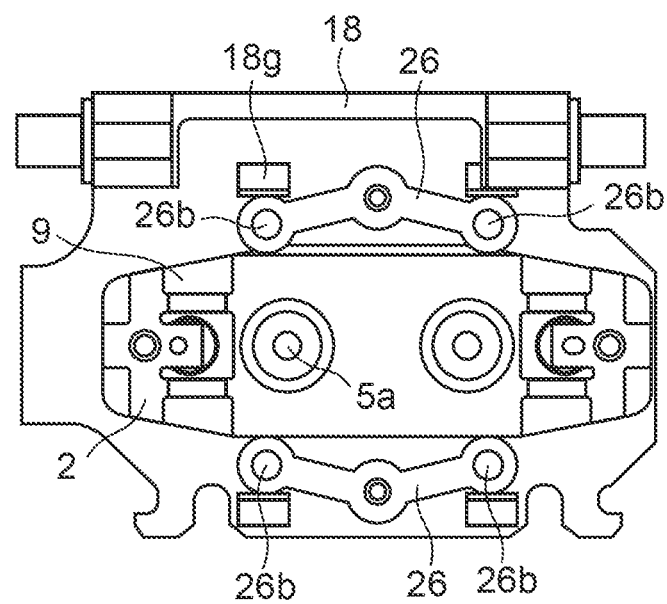
FIGS. 9A and 9B are plan views of the upper support member and a lower support member.

FIG. 9A is a plan view showing the upper support member 18 from a side on which the projection parts 5 of the vibrator 2 are disposed. The two vibration damping members 26 are disposed to sandwich the holding member 9 in the shorter direction of the holding member 9. Furthermore, both ends of the vibration damping member 26 are formed in a cylindrical shape including hole parts 26b, and each cylindrical part is sandwiched between a protrusion part 18g formed on the upper support member 18 and the holding member 9. Although FIG. 9A shows a state where the columnar parts of the vibration damping members 26 are not deformed, the vibration damping members 26 are desirably mounted while being deformed to such a degree that the columnar parts are crushed, to reliably apply the pressurizing force to the holding member 9 in a damping force acting direction.

The holding member 9 receives the reaction forces of the vibration damping members 26 as biasing forces and is pressurized in the damping force acting direction, so that vibration transmitting from the vibrator 2 to the holding member 9 is damped by the vibration damping members 26, and, as a result, occurrence of abnormal noise can be prevented. Furthermore, similarly to the first embodiment, a resultant force of the given pressure in the damping force acting direction applied to the holding member 9 by the vibration damping members 26 is substantially zero. Hence, the given pressure of the vibration damping members 26 do not become loads with respect to movement of the holding member 9 in the vibrator pressurizing direction. It is also desirable to apply a fluorine coating on contact parts and vicinities of the contact parts of the vibration damping members 26 and the holding member 9 and decrease friction coefficients of the contact parts of the vibration damping members 26 and the holding member 9.

Figure 9B:
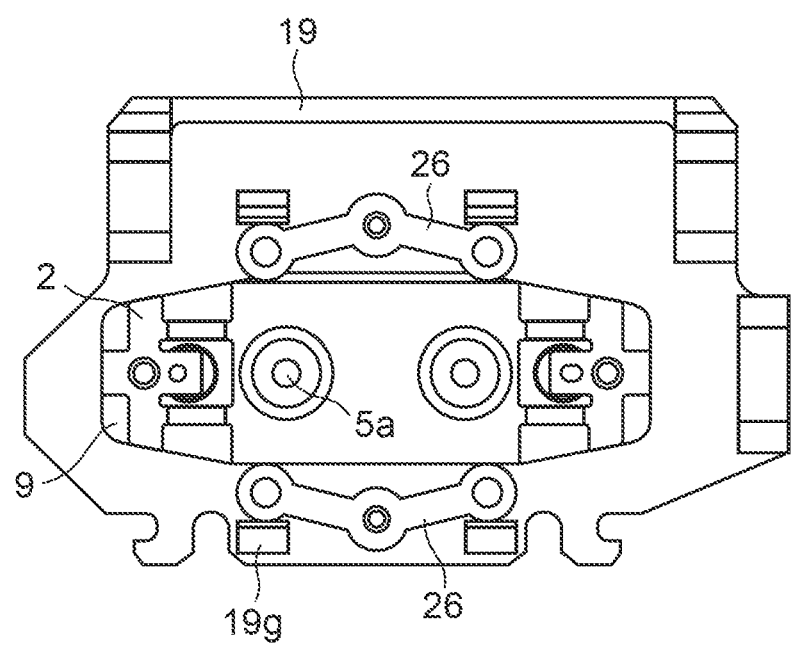

FIG. 9B is a plan view showing the lower support member 19 from a side on which the projection parts 5 of the vibrator 2 are disposed. A configuration of the lower support member 19 conforms to the configuration of the upper support member 18. That is, the two vibration damping members 26 are disposed to sandwich the holding member 9 in the shorter direction of the holding member 9. Furthermore, the both ends of the vibration damping member 26 are formed in a cylindrical shape including the hole parts 26b, and each cylindrical part is sandwiched between a protrusion part 19g formed on the lower support member 19 and the holding member 9. Hence, also in the lower support member 19, the vibration transmitting from the vibrator 2 to the holding member 9 is damped by the vibration damping members 26, so that occurrence of abnormal noise is prevented. Thus, in the present embodiment, in a case of the vibrating type actuator 17 in which the vibration damping members cannot be disposed around the contact body 10, vibration which causes occurrence of abnormal noise is damped around the holding member 9 to prevent the occurrence of the abnormal noise.

It should be noted that the vibrating type actuator 17 adopts a configuration where the two vibration damping members 26 sandwich the holding member 9 in the shorter direction of the holding member 9, but may adopt a configuration where the two vibration damping members 26 sandwich the holding member 9 in the longitudinal direction of the holding member 9. Furthermore, one of the vibration damping members described in the first embodiment may be used instead of the vibration damping members 26.

Figure 10:
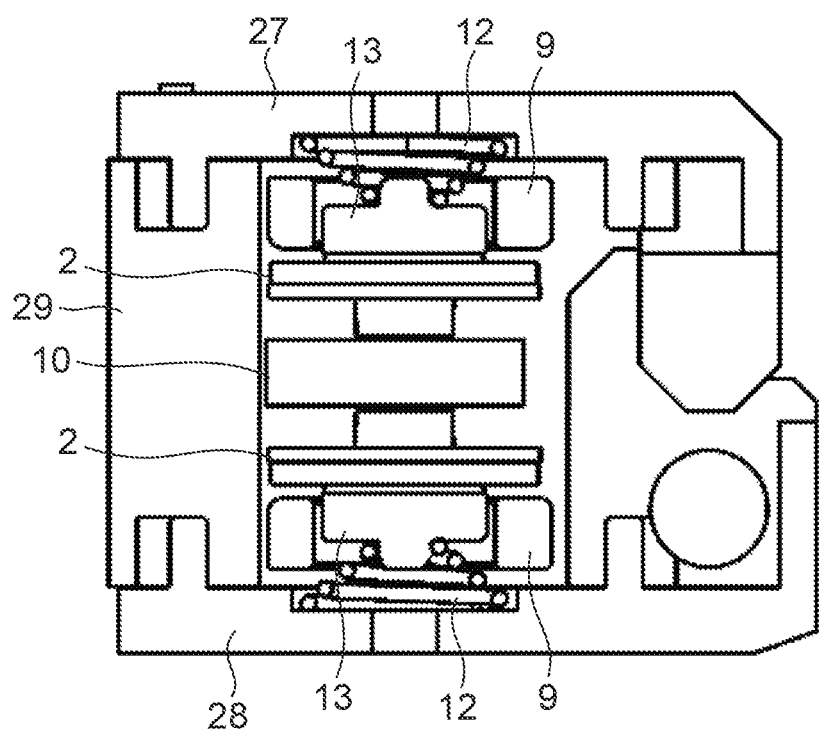
FIG. 10 is a cross-sectional view of a pressurizing mechanism which is applicable to the vibrating type actuator.

In the present embodiment, the configuration where the tension coil springs 25 are used as pressurizing mechanisms which place the vibrators 2 in contact with the contact body 10, was described. Here, an alternative pressurizing mechanism will be described hereinafter. FIG. 10 is a cross-sectional view for explaining another pressurizing mechanism which is applicable to the vibrating type actuator 17 to place the vibrators 2 in contact with the contact body 10. An upper support member 27 and a lower support member 28 are members with which the upper support member 18 and the lower support member 19 are replaced, respectively. Each of the upper support member 27 and the lower support member 28 is provided with a recess part which receives a conical coil spring which is a pressurizing member 12. Except this point, schematically speaking, the upper support member 27 has the same shape as that of the upper support member 18, and the lower support member 28 has the same shape as that of the lower support member 19. The upper support member 27 and the lower support member 28 are openable and closable about a connection pin which is not shown, and are fixed in a state where the upper support member 27 and the lower support member 28 are opened at a predetermined angle by a columnar member 29. When the contact body 10 is sandwiched by the two vibrators 2, the pressurizing member 12 disposed between the upper support member 27 and the pressurizing block 13 and the pressurizing member 12 disposed between the lower support member 28 and the pressurizing block 13 place the vibrators 2 in contact with the contact body 10 with a predetermined pressurizing force.

Third Embodiment

Figure 11:
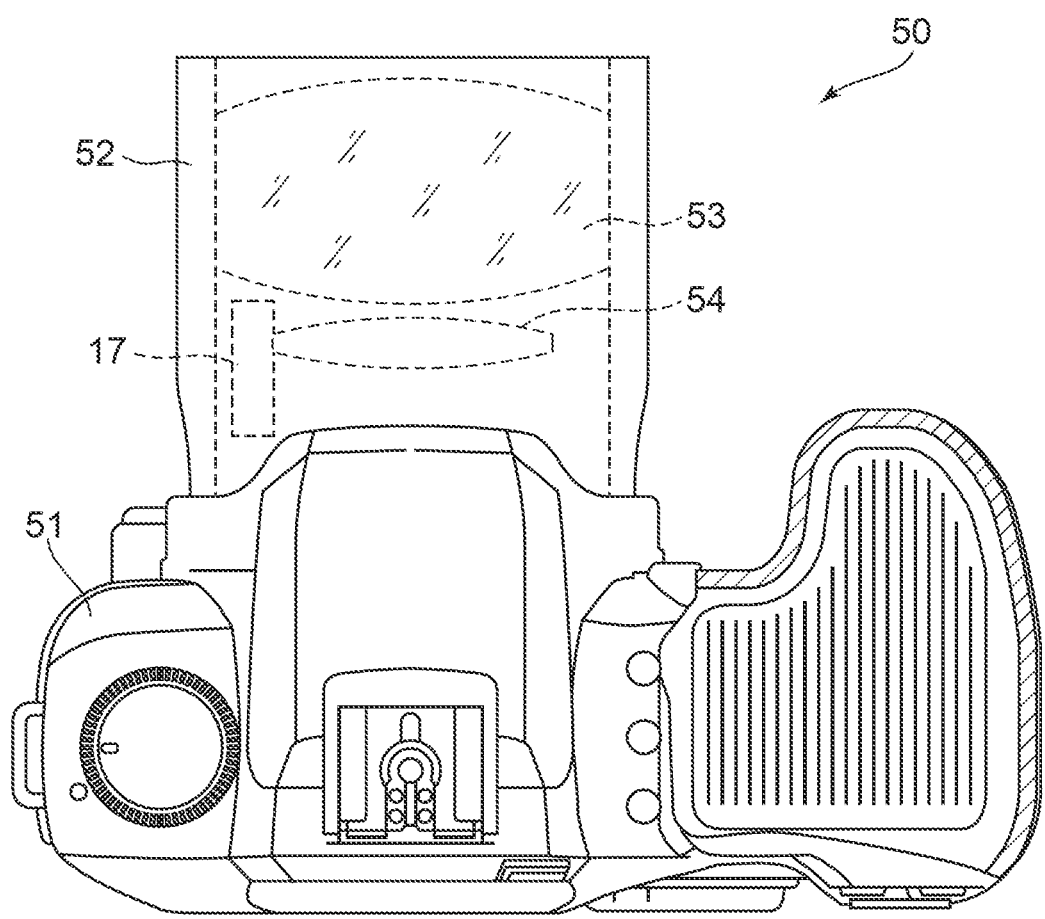
FIG. 11 is a top view showing a schematic configuration of an image pickup apparatus including the vibrating type actuator.

FIG. 11 is a top view showing a schematic configuration of an image pickup apparatus 50 including a vibrating type actuator 17. The image pickup apparatus 50 includes an image pickup apparatus main body 51 which includes an image pickup device (not shown), and a lens barrel 52 which is attachable and detachable to and from the image pickup apparatus main body 51. The lens barrel 52 includes a plurality of lens groups 53, a focus adjustment lens 54 and the vibrating type actuator 17. A lens holding frame (not shown) which holds the focus adjustment lens 54 is coupled to an upper support member 18 or a lower support member 19 which is a mobile body of the vibrating type actuator 17. By driving the vibrating type actuator 17, it is possible to drive the focus adjustment lens 54 in an optical axis direction and adjust the focus on a subject.

It should be noted that, when a zoom lens is disposed in the lens barrel 52, the vibrating type actuator 17 can be used as a driving source which moves the zoom lens in the optical axis direction. Furthermore, when an image blur correction lens is disposed in the lens barrel 52, the vibrating type actuator 17 can be used as a driving source which drives the image blur correction lens on a plane orthogonal to an optical axis.

Fourth Embodiment

Figure 12:
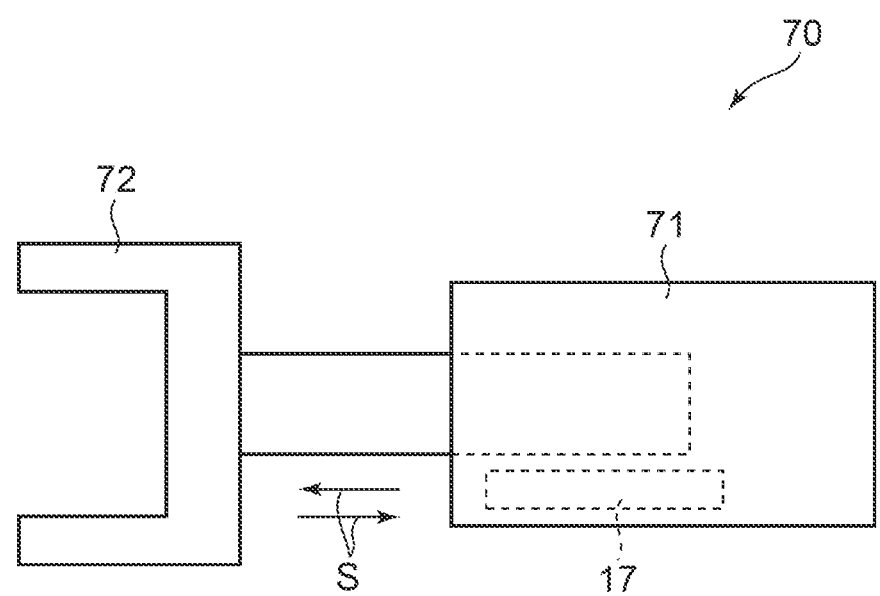
FIG. 12 is a view showing a schematic configuration of a manipulator including the vibrating type actuator.
Figure 13:
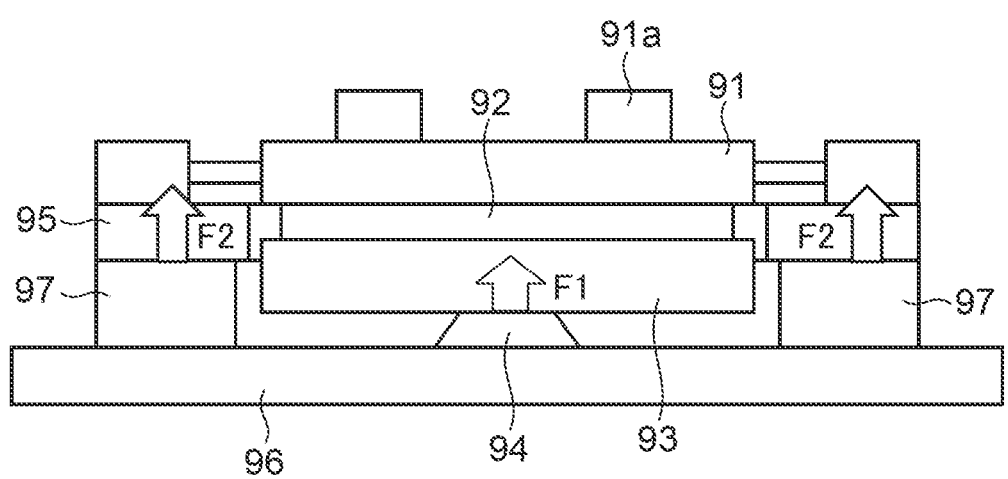
FIG. 13 is a side view schematically showing one example of a configuration to prevent occurrence of abnormal noise in the vibrating type actuator according to a conventional technique.

FIG. 12 is a view showing a schematic configuration of a manipulator 70 including a vibrating type actuator 17. The manipulator 70 includes a support part 71, the vibrating type actuator 17 which is disposed in the support part 71, and a hand part 72 which is disposed slidably in an arrow S direction with respect to the support part 71. The hand part 72 is coupled to an upper support member 18 or a lower support member 19 which is a mobile body of the vibrating type actuator 17. The vibrating type actuator 17 is used as a driving source which drives the hand part 72 in the arrow S direction (stretches or contracts the hand part 72 in the arrow S direction).

The present invention has been described in detail above based on the preferred embodiments. However, the present invention is not limited to these specific embodiments, and the present invention includes various modes without departing from the gist of the invention. Furthermore, each of the above embodiments is only one embodiment of the present invention, and each of the embodiments can be also appropriately combined. For example, an image pickup apparatus 50 and the manipulator 70 have been described as devices including the vibrating type actuator 17. However, specific application examples of a vibrator unit 1 and the vibrating type actuator 17 are not limited to these examples. The vibrator unit 1 and the vibrating type actuator 17 are widely applicable as driving sources of parts which need to be positioned, to optical devices, electronic devices, machine tools and medical devices and the like.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-006682, filed Jan. 18, 2018, which is hereby incorporated by reference wherein in its entirety.

What is claimed is:

1. A vibrating type actuator that comprises a vibrator in which vibration is excited, and a contact body which is in contact with the vibrator, wherein the vibrator and the contact body move relatively to each other, the vibrating type actuator further comprising:
- a holding member configured to hold the vibrator;
- a pressurizing member configured to pressurize the vibrator against the contact body;
- a support member configured to movably support the holding member in a pressurizing direction, in which the pressurizing member performs pressurization; and
- a vibration damping member which is in contact with the holding member at a plurality of portions while sandwiching the holding member in a direction orthogonal to the pressurizing direction.

2. The vibrating type actuator according to claim 1, wherein a pressing force that acts on the holding member at the plurality of portions in the direction orthogonal to the pressurizing direction is cancelled.

3. The vibrating type actuator according to claim 1, wherein a resultant force of the pressing force which acts on the holding member at the plurality of portions in the direction orthogonal to the pressurizing direction is regarded as zero.

4. The vibrating type actuator according to claim 1, wherein the vibration damping member is in contact with the holding member while sandwiching the holding member in a direction orthogonal to a relative movement direction, in which the vibrator and the contact body move relatively to each other, and orthogonal to the pressurizing direction.

5. The vibrating type actuator according to claim 1, wherein the vibration damping member is in contact with the holding member while sandwiching the holding member in a direction parallel to a relative movement direction, in which the vibrator and the contact body move relatively to each other, and orthogonal to the pressurizing direction.

6. The vibrating type actuator according to claim 1, wherein a contact surface of the vibration damping member, which is in contact with the holding member, is subjected to a processing for decreasing a friction coefficient of the contact surface.

7. The vibrating type actuator according to claim 1, wherein a hole part is formed at a contact part of the vibration damping member, which is in contact with the holding member, wherein the hole part penetrates the vibration damping member in a direction orthogonal to a contact surface between the vibration damping member and the holding member.

8. The vibrating type actuator according to claim 1, wherein a gap is formed between an opposite surface of a contact part of the vibration damping member and the support member in a direction in which the vibration damping member presses the holding member, the opposite surface being opposite to a surface of the contact part of the vibration damping member, which is in contact with the holding member.

9. The vibrating type actuator according to claim 1, wherein the vibration damping member is made of a rubber, a resin having elasticity or a polymer gel.

10. The vibrating type actuator according to claim 1, wherein the vibrating type actuator comprises two vibrators, and the two vibrators are disposed to sandwich the contact body.

11. The vibrating type actuator according to claim 1, wherein the vibrator is in contact with the contact body at a distal end of one or more projection parts provided on the vibrator.

12. An electronic device comprising:
- an vibrating type actuator; and
- a member positioned by a vibrating type actuator driving, wherein the vibrating type actuator comprises a vibrator in which vibration is excited, and a contact body which is in contact with the vibrator, wherein the vibrator and the contact body move relatively to each other, and wherein the vibrating type actuator further comprises:
- a holding member configured to hold the vibrator;
- a pressurizing member configured to pressurize the vibrator against the contact body;
- a support member configured to movably support the holding member in a pressurizing direction, in which the pressurizing member performs pressurization; and
- an vibration damping member which is in contact with the holding member at a plurality of portions while sandwiching the holding member in a direction orthogonal to the pressurizing direction.

\* \* \* \* \*